(12) United States Patent
Dormiani

(10) Patent No.: US 10,663,597 B1
(45) Date of Patent: May 26, 2020

(54) DUAL-TECHNOLOGY ONBOARD AIR TRAFFIC TRACKING SYSTEM FOR AUTONOMOUS AERIAL VEHICLES

(71) Applicant: Wing Aviation LLC, Mountain View, CA (US)

(72) Inventor: Parsa Dormiani, Mountain View, CA (US)

(73) Assignee: Wing Aviation LLC, Mountain View, CA (US)

( * ) Notice: Subject to any disclaimer, the term of this patent is extended or adjusted under 35 U.S.C. 154(b) by 200 days.

(21) Appl. No.: 15/682,181

(22) Filed: Aug. 21, 2017

(51) Int. Cl.
*H04J 3/00* (2006.01)
*G01S 19/03* (2010.01)
*B64C 39/02* (2006.01)
*G01S 19/24* (2010.01)

(52) U.S. Cl.
CPC ............ *G01S 19/03* (2013.01); *B64C 39/024* (2013.01); *B64C 2201/145* (2013.01); *G01S 19/24* (2013.01)

(58) Field of Classification Search
CPC ....... G01S 19/03; G01S 19/24; B64C 39/024; B64C 2201/145
See application file for complete search history.

(56) References Cited

U.S. PATENT DOCUMENTS

| | | | |
|---|---|---|---|
| 9,218,741 B2 | 12/2015 | Wu et al. | |
| 9,274,521 B1 | 3/2016 | Stefani et al. | |
| 9,405,005 B1* | 8/2016 | Arteaga | G01S 13/91 |
| 2009/0146875 A1* | 6/2009 | Hovey | G08G 5/04 342/357.31 |
| 2010/0283661 A1 | 11/2010 | Strain et al. | |
| 2016/0308602 A1 | 10/2016 | DeBusk et al. | |
| 2018/0246200 A1* | 8/2018 | Goossen | G01S 5/0072 |
| 2019/0019420 A1* | 1/2019 | X | B64C 39/024 |

* cited by examiner

*Primary Examiner* — Abdelnabi O Musa
(74) *Attorney, Agent, or Firm* — McDonnell Boehnen Hulbert & Berghoff LLP

(57) ABSTRACT

Systems and methods for dual-technology air traffic tracking are disclosed. An autonomous aerial vehicle (AAV) may include a low-power dual-technology transponder configured for transmitting real-time tracking data of the AAV in outbound tracking messages, using both first and second transmission technologies specified for operation within a common flight tracking system. The AAV may further include a global positioning satellite (GPS) system, one or more processors, and memory storing instructions for carrying out dual-technology tracking. Operations may include determining real-time tracking data of the AAV from the GPS system, and broadcasting outbound tracking messages alternatingly in time using the first and second technologies in ping-pong fashion, the outbound tracking messages including the determined real-time tracking data and an identifier of the AAV. The tracking data may include location of the AAV. In an example embodiment, the common tracking system may be ADS-B and the two technologies may be 1090ES and UAT.

20 Claims, 6 Drawing Sheets

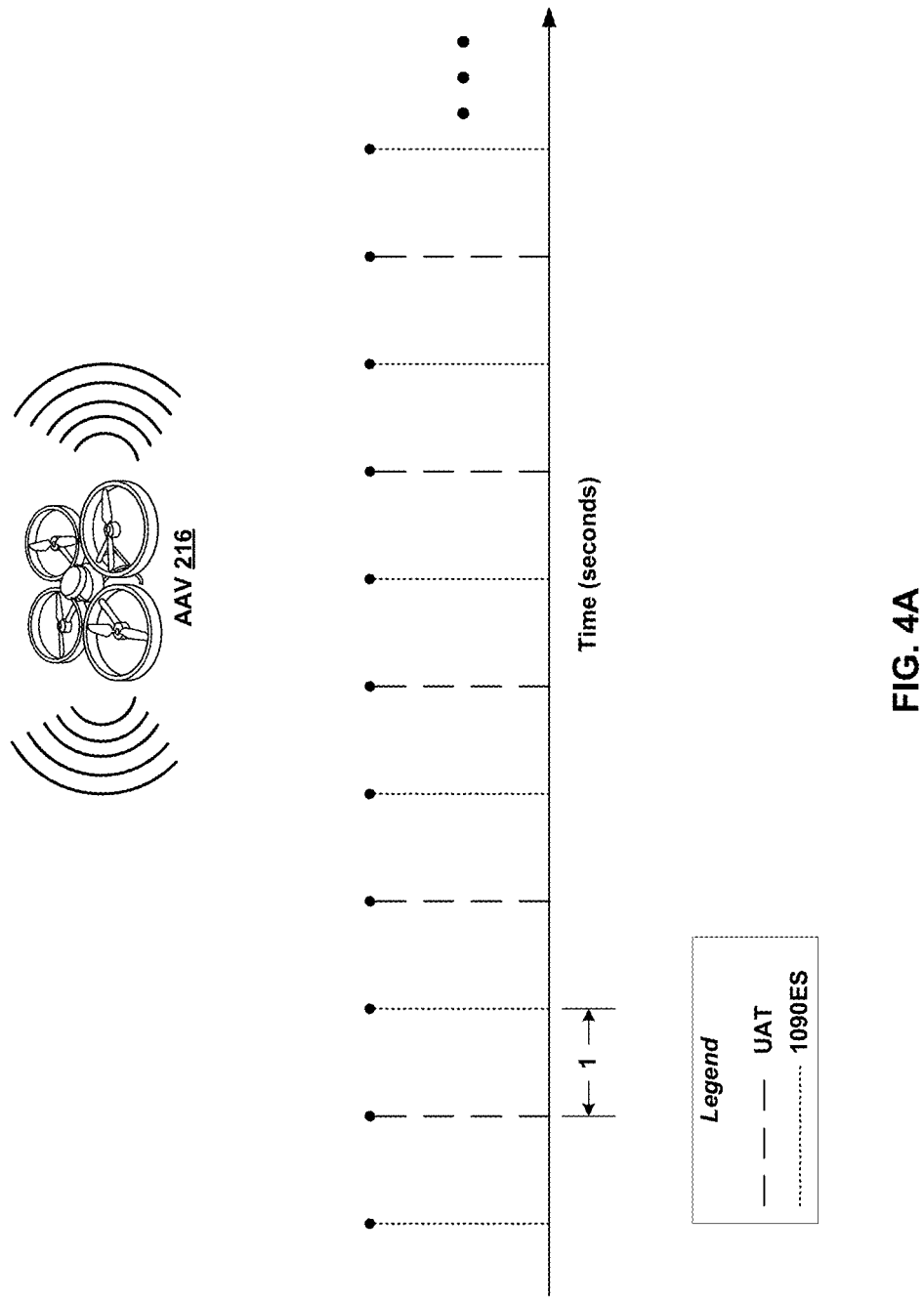

500

DETERMINE REAL-TIME TRACKING DATA OF AN AV FROM A NAVIGATION SYSTEM ONBOARD THE AV, WHEREIN THE TRACKING DATA INCLUDE GEOGRAPHIC LOCATION OF THE AV OVER TIME — 502

USE A LOW-POWER DUAL-TECHNOLOGY TRANSPONDER ONBOARD THE AV TO BROADCASTING OUTBOUND TRACKING MESSAGES ALTERNATINGLY IN TIME USING A FIRST TRANSMISSION TECHNOLOGY AND A SECOND, DIFFERENT TRANSMISSION TECHNOLOGY IN PING-PONG FASHION, WHEREIN THE OUTBOUND TRACKING MESSAGES INCLUDE THE DETERMINED REAL-TIME TRACKING DATA OVER TIME AND AN IDENTIFIER OF THE AV, AND WHEREIN THE FIRST AND SECOND TRANSMISSION TECHNOLOGIES ARE SPECIFIED FOR OPERATION WITHIN A COMMON FLIGHT TRACKING SYSTEM — 504

DUAL-TECHNOLOGY ONBOARD AIR TRAFFIC TRACKING SYSTEM FOR AUTONOMOUS AERIAL VEHICLES

BACKGROUND

Aircraft tracking systems are used for monitoring airspace for flight safety and air traffic control. Also referred to as air traffic surveillance systems, aircraft tracking systems can be deployed both as ground systems and onboard systems, and can include ground components and onboard components that communicate and cooperate with each other to provide real-time, live information about aircraft location, motion, and identification. An example of tracking technology is conventional radar.

As part of a process to modernize air traffic surveillance, conventional radar is being phased out in favor of a self-reporting scheme in which individual aircraft use satellite-based global position system (GPS) surveillance to determine their respective tracking data (e.g., position and velocity), and then broadcast the information to ground stations and possibly other aircraft within some reception range. Receivers of broadcast tracking information—both ground stations and aircraft—may then use it for various management and safety operations, such as routing and collision avoidance. The new self-reporting scheme has been developed according to a standard referred to as Automatic Dependent Surveillance-Broadcast, or ADS-B.

Under ADS-B, two different transmission link technologies have been implemented that are compliant with the standard but not directly compatible with each other. Both technologies employ radio frequency (RF) transmission and reception, differing mainly according to RF operating frequency and transponder technology, as well as certain aspects of message structure. The two technologies are Universal Access Transmitter (UAT), which operates at 978 MHz, and 1090 MHz Extended Squitter (1090ES), which operates at 1,090 MHz.

In order to bridge the incompatibility between UAT and 1090ES, ADS-B-compliant ground systems can receive messages on both technologies, and then translate and rebroadcast the translated messages on the respective technologies. A network of ground stations enables aircraft with one of the two systems to receive translated messages from aircraft with the other of the two systems via the ground system. Any two aircraft using the same system can receive messages from each other directly.

SUMMARY

In one aspect, an autonomous aerial vehicle (AAV) is provided. The AAV includes a low-power dual-technology transponder configured to transmit real-time tracking data of the AAV in outbound tracking messages using both a first transmission technology and a second, different transmission technology, wherein the first and second transmission technologies are specified for operation within a common flight tracking system a global positioning satellite (GPS) navigation system; one or more processors; and memory storing instructions that, when executed by the one or more processors, cause the AAV to carry out operations including: determining real-time tracking data of the AAV from the GPS navigation system, the real-time tracking data including real-time geographic location of the AAV over time; and broadcasting outbound tracking messages alternatingly in time using the first and second transmission technologies in ping-pong fashion, the outbound tracking messages including the determined real-time tracking data over time and an identifier of the AAV.

In another aspect, a flight-tracking communication device is provided. The flight-tracking communication device is configured for operation in an aerial vehicle (AV), and includes a low-power dual-technology transponder configured to transmit real-time tracking data of the AV in outbound tracking messages using both a first transmission technology and a second, different transmission technology, wherein the first and second technologies are specified for operation within a common flight tracking system; one or more processors; and memory storing instructions that, when executed by the one or more processors, cause the flight-tracking communication device to carry out operations including: receiving real-time tracking data of the AV from a global positioning satellite (GPS) navigation system, the real-time tracking data including real-time geographic location of the AV over time; and broadcasting outbound tracking messages alternatingly in time using the first and second transmission technologies in ping-pong fashion, the outbound tracking messages including the determined real-time tracking data over time and an identifier of the AV.

In yet another aspect, a method is provided. The method is carried out in an aerial vehicle (AV), and includes determining real-time tracking data of the AV from a navigation system onboard the AV, the tracking data including geographic location of the AV over time; and using a low-power dual-technology transponder onboard the AV, broadcasting outbound tracking messages alternatingly in time using a first transmission technology and a second, different transmission technology in ping-pong fashion, the outbound tracking messages including the determined real-time tracking data over time and an identifier of the AV, wherein the first and second transmission technologies are specified for operation within a common flight tracking system.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 4A depicts an illustrative representation of one example mode of dual-technology broadcasting of flight tracking messages, in accordance with example embodiments.

FIG. 5 is a flowchart of a method of dual-technology broadcasting of flight tracking messages, in accordance with example embodiments.

DETAILED DESCRIPTION

Figure 1:
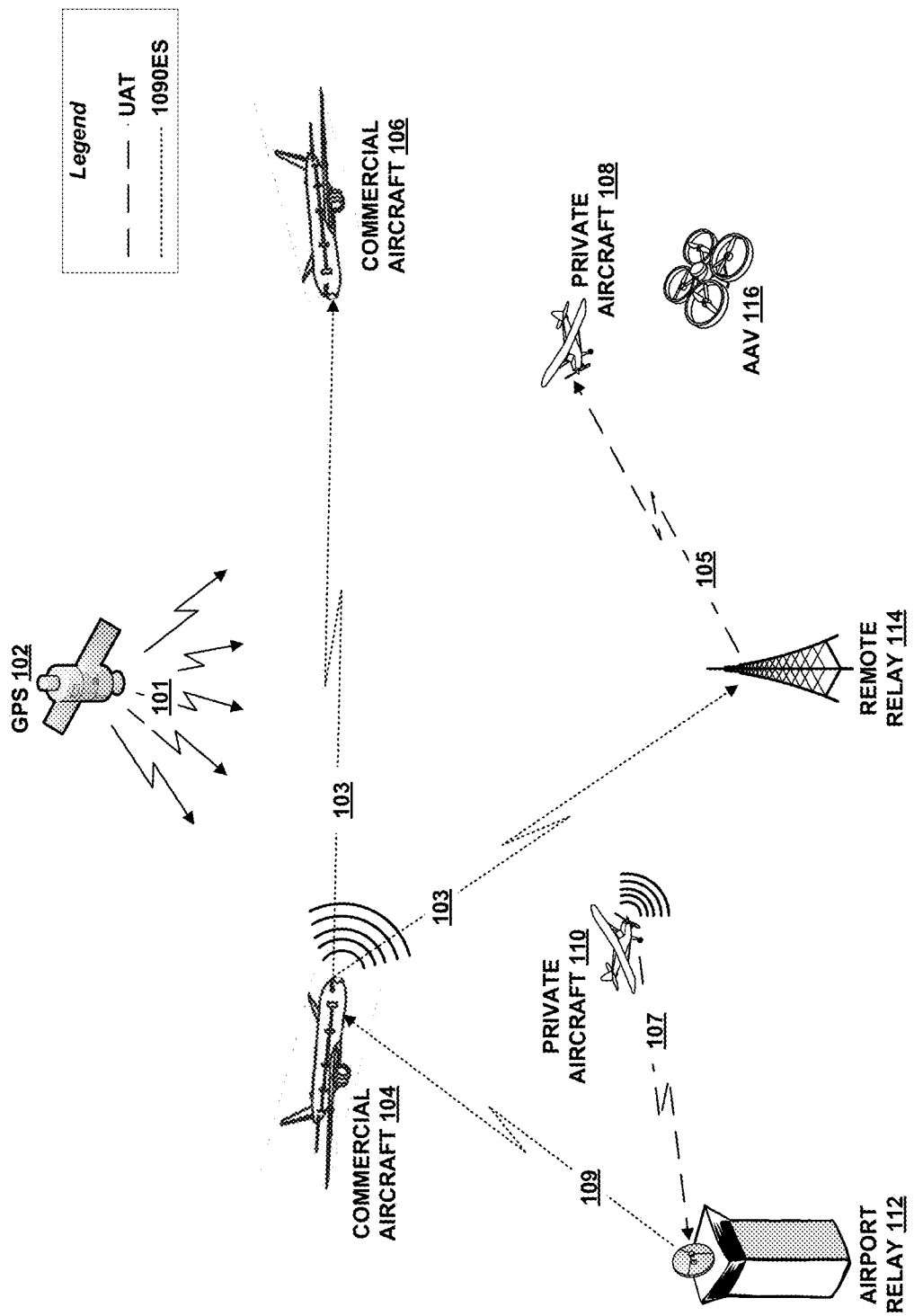
FIG. 1 is a simplified illustration of an operating environment in which a dual-technology onboard air traffic tracking system may be implemented, in accordance with example embodiments.

Exemplary methods and systems are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

Overview

Within national and international airspace, operation of either UAT or 1090ES onboard aircraft calls for relatively high-power transmitters in order for aircraft transmissions to reach ground stations and other in-flight aircraft. Commercial and private aircraft typically fly at sufficiently high altitudes to have RF line-of-sight (LOS) to one or more ground stations. Transmitter powers of 45 Watts to 120 Watts are needed to ensure the distance ranges are adequately covered. As a result, UAT and 1090ES onboard systems tend to be large, heavy, and expensive. But the interoperability provided by the translating/retransmitting ground stations ensures that whichever of the onboard systems is deployed, compliance with ADS-B and the airspace safety it affords will be maintained.

For autonomous aerial vehicles (AAVs), such as unmanned aerial vehicles (UAVs), deployment and operation of either of UAT or 1090ES can be problematic for at least two reasons. One is because AAVs typically fly at low altitudes where they routinely lack RF LOS to ADS-B ground stations. Thus, they often cannot make broadcasts of their tracking information that reliably reach ground stations, and they cannot reliably receive retransmissions of other aircrafts' tracking information from ground stations. The other reason is that the size, weight, and power requirements of UAT and 1090ES systems exceed what can generally be accommodated by a typical AAV.

However, it is recognized herein that the very operational and configurational aspects of AAVs that would appear to exclude them from (or make it difficult for) implementing ADS-B-compliant onboard systems can be recast as a basis for modifications to UAT and 1090ES that enable a robust and reliable solution for AAV operations. Specifically, in the low altitude flight environment typical of AAVs, the distance range for flight-safety monitoring of other nearby flight vehicles is small—only 2-3 miles, for example. As a result, the power requirement for a transmitter is much smaller than for conventional aircraft. For example, a 0.25 Watt transmitter can be sufficient for broadcast coverage in this distance range. The size and weight of a transmitter or transponder can be correspondingly much smaller than a conventional UAT or 1090ES onboard system, as well. This is small enough that both technologies can be accommodated on an AAV.

Thus, in accordance with example embodiments, a dual-technology ADS-B-compliant system is implemented under reduced power, size, and weight specifications of an AAV for operation of both technologies on an alternating, or "ping-pong" basis. In an example embodiment, the dual technologies are UAT and 1090ES.

In an example embodiment, an AAV may include a light-weight, low-power dual-technology transponder, a GPS navigation system, one or more processors, and executable instructions that, when executed by the processor, cause the AAV to carry out operations of ping-pong broadcasting of tracking information of the AAV while in flight (or possibly on the ground prior to or after flight), and to further carry out operations of receiving, on both of the dual technologies, incoming tracking information messages from other aircraft. The operations further include processing and interpretation of the incoming messages for application in flight safety and management operations. By way of example, the low-power dual-technology transponder could be configured for transmitting at 0.25 Watts using either of the dual technologies. In further accordance with example embodiments, the dual-technology transponder and related components will be within size and weight constraints of the AAV.

In example operation, a dual-technology onboard system can alternatingly broadcast UAT-compliant and 1090ES-compliant messages of its tracking information. By doing so, other aircraft within range can receive messages that will be compliant with whichever system those other aircraft happen to deploy. Thus, an aircraft using UAT will be able to receive and interpret the AAV's UAT messages. Similarly, an aircraft using 1090ES will be able to receive and interpret the AAV's 1090ES messages. Since the messages will be directly received by the other aircraft, the AAV's possible lack of the RF LOS to a ground station will no longer be a problem.

Also in example operation, a dual-technology onboard system can receive both UAT-compliant and 1090ES-compliant messages directly from other aircraft. So again, the AAV's possible lack of the RF LOS to a ground station is no longer a problem. That is, an AAV equipped with a dual-technology ADS-B system can derive the operational benefits of ADS-B regardless of whether or not it has an RF LOS to a ground station.

Illustrative Operating Environment

Example embodiments herein are described in the context of ADS-B and the two currently-specified transmission (or air-interface) technologies, UAT and 1090ES. It will be appreciated, however, that the concepts and principles described herein as applied to UAT and 1090ES can be applied as well to other transmission or air-interface technologies that could be specified for use in ADS-B and/or any other multi-technology air traffic tracking system or flight tracking system. As such, the concepts, principles, and example embodiments described herein should not be viewed as limited to applicability to only ADS-B, UAT, and/or 1090ES.

FIG. 1 is a simplified diagram representing an example operational environment in which ADS-B is deployed and example embodiments of dual-technology flight tracking may be implemented. By way of example, FIG. 1 depicts a number of aircraft in flight; specifically, two commercial aircrafts 104 and 106, two private aircrafts 108 and 110, and an AAV 116. A global positioning navigation network (GPNN) satellite, GPS 102, in depicted as broadcasting GPS signals 101 that may be received and processed by GPS-enabled devices to determine geographic location and motion information of the GPS-enabled device (or a vehicle in which it operates, for example) in a manner as is known.

In practice, the GPS 102 and the signals 101 are typically implemented using a network of multiple satellites, as is also known.

FIG. 1 also includes, again by way of example, two ADS-B ground relay stations, namely an airport relay 112 and a remote relay 114. Under ASD-B, a ground relay station may function to receive flight tracking messages on either one of the two transmission technologies, and rebroadcast the message on the other one of the two transmission technologies. That is, a relay ground station can receive a flight tracking message on UAT and rebroadcast the message on 1090ES. Similarly, the relay ground station can receive a flight tracking message on 1090ES and rebroadcast the message on UAT. The relay ground station may also translate between 1090ES and UAT messages in the relay processes.

In operation, a flight vehicle, such as the commercial aircraft 104, may continually (e.g., over the course of travel between points) receive and process GPS signals 101 to determine real-time tracking information, including geographic location (e.g., latitude, longitude, and altitude) as well as possibly heading and speed. An ADS-B system onboard the aircraft may continuously or periodically generate flight tracking messages containing current real-time tracking information, as well as an aircraft identifier and other information, such as time stamps and environmental conditions, for example. In conventional operation under ADS-B, the flight tracking messages, referred to as ADS-B messages, will be broadcast on a periodic basis, using one of the two transmission technologies—i.e., either 1090ES or UAT. A typical periodicity is one second, though other periods could be used. Broadcast ADS-B messages are referred to as ADS-B Out messages.

Upon reception of ADS-B messages, a receiving ADS-B entity may process the message to extract the real-time tracking information. Received ADS-B messages are referred to as ADS-B In messages. Depending on the facility or vehicle in which the entity operates, the real-time tracking information extracted from ADS-B In messages may then be applied to or used for one or more purposes. For example, for air traffic control (ATC) ground operations, the real-time tracking information may be used for air traffic management and control. Ground operations may also include a remote reception stations with backhaul connections to ATC operations, for example. An aircraft in flight receiving ADS-B In messages may apply the real-time tracking information to local airspace monitoring and awareness and collision avoidance system.

Conventional deployment of ADS-B systems in aircraft uses one or the other of 1090ES or UAT, but not both. This is generally because ADS-B systems can be costly, and require power, size, and weight capacities that can be accommodated by commercial aircraft and private aircraft. As a result, an aircraft with a conventional ADS-B deployment can only receive ADS-B In messages broadcast using the same transmission technology as that of the onboard system. As described above, however, relay ground stations can function to translate between transmission technologies, so that an aircraft can receive ADS-B In messages on its deployed transmission technology. Thus, another function of ground operations is translate ADS-B In messages from an incoming message protocol to an outgoing message protocol, and rebroadcast the translated messages as ADS-B Out messages.

FIG. 1 illustrates a few examples of message protocol translation. As indicated in the legend in the figure, 1090ES transmissions are represented in short-dotted lines, and UAT messages are represented in long-dashed lines. In the illustration, the commercial aircraft 104 broadcasts ADS-B Out messages 103, which are received by the commercial aircraft 106 and the remote relay 114 (there may be other receiving entities, but only these two are shown the sake of brevity in the figure). By way of example, the commercial aircraft 106 also uses 1090ES, so no translation is need; it can presumably use the incoming messages for collision avoidance and other local airspace monitoring functions. The remote relay 114 translates the incoming messages 106 from 1090ES to UAT and rebroadcasts the translated messages as ADS-B Out messages 105. In the illustration, the private aircraft 108, which by way of example employs UAT, receives the messages 105 and can apply them to collision avoidance and other local airspace monitoring functions.

As a further illustration, the private aircraft 110, which by way of example employs UAT, broadcasts ADS-B Out messages 107. These are received by the airport relay 112, which translates the incoming messages 107 from UAT to 1090ES and rebroadcasts the translated messages as ADS-B Out messages 109. The commercial aircraft 104 receives the messages 109 and can apply them to collision avoidance and other local airspace monitoring functions. Other possible recipients of ADS-B Out messages 107 or their translated versions ADS-B Out 109 are omitted from the figure for the sake brevity.

As noted, FIG. 1 also depicts an AAV 116. This may be too small and/or underpowered of a vehicle to accommodate a conventional ADS-B system—either UAT or 1090ES. It may also routinely be out of range of, or lack a line-of-sight to, a ground relay station, such as relay 114 or 112. However, in accordance with example embodiments, the AAV 116 may be equipped with a low-power, light-weight, dual-technology ADS-B transponder capable alternating, ping-pong transmission of both UAT and 1090ES, as well as receiving both UAT and 1090ES. As a result, the AAV 116 can make its tracking information known to other aircraft that use either technology, even if its broadcasts can't or don't reach any ground relay station. Further, the AAS 116 can receive ADS-B In message from other aircraft directly, again without the need for an intervening ground relay station.

Figure 2:
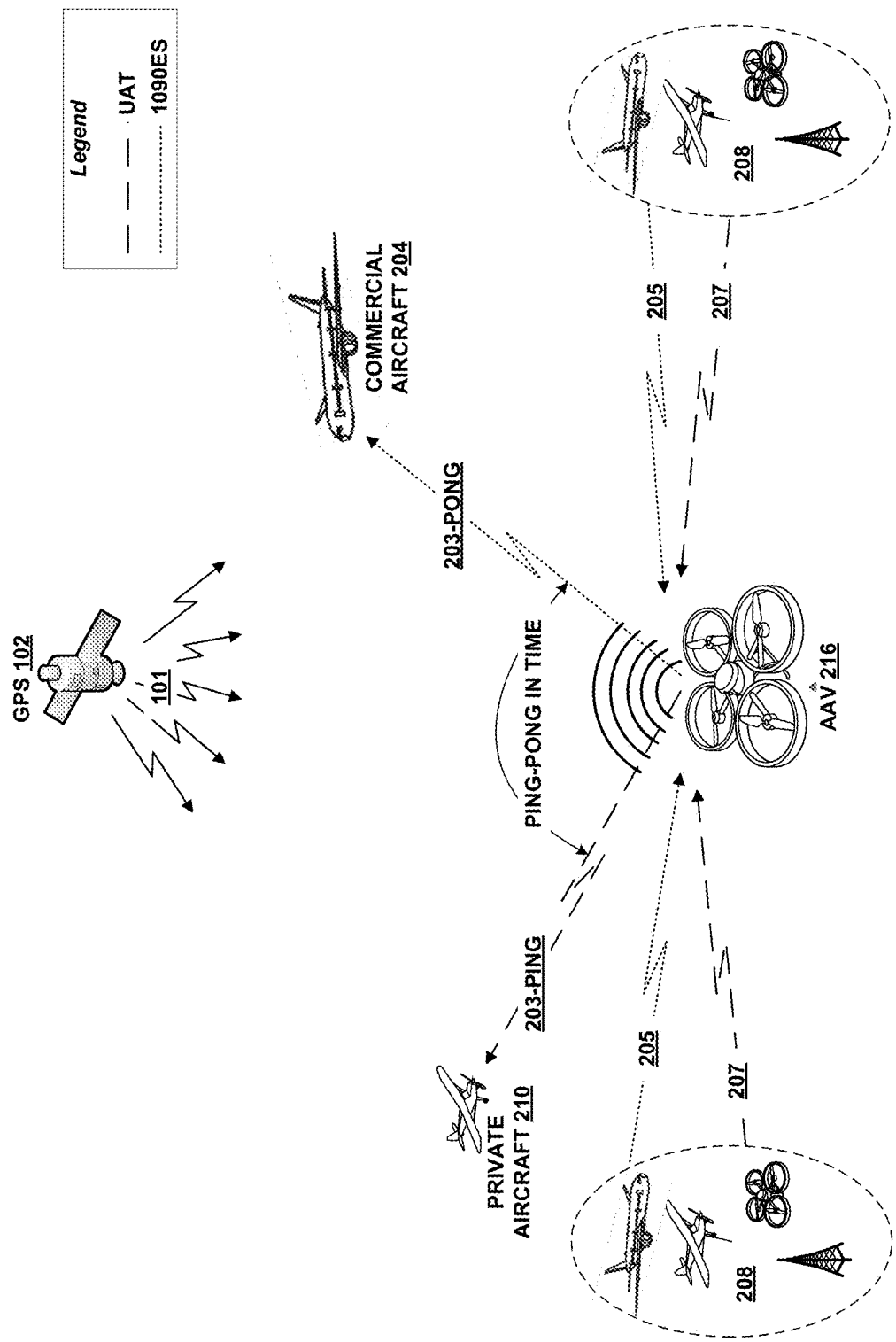
FIG. 2 depicts an illustrative representation of operation of a dual-technology onboard air traffic tracking system, in accordance with example embodiments.

FIG. 2 is a conceptual illustration of a dual-technology onboard air traffic tracking system, in accordance with example embodiments. As shown, a GPS satellite system 102 broadcasts GPS signals 101, as in FIG. 1. An AAV 216 is represented as broadcasting UAT messages 203-ping and 1090ES messages 203-pong, such that the ADS-B Out messages from the AAV 216 alternate in time in ping-pong fashion. In the example illustrated, a private aircraft 210 can directly receive the UAT messages (the "ping" broadcast), and a commercial aircraft 204 can directly receive the 1090ES message (the "pong" broadcast). Note that both the UAT and 1090ES broadcasts are typically omnidirectional. The representation of two directed transmissions is meant only to distinguish between the two in their alternation in time, as well as to indicate which aircraft are making use of directly received transmissions.

The AAV 216 can also receive both 1090ES messages 205 and UAT messages 207 from transmitting entities 208, which can be commercial aircraft, private aircraft, other AAVs, and/or ground relay stations, as indicated. Note that in receiving an ADS-B In message from a ground relay stations, that transmission may be a translation between a UAT and 1090ES message. As such, the message may duplicate a message received directly from a flight vehicle prior to translation by the ground relay station. For example, the AAV 216 may receive a UAT message directly from a UAT-enabled flight vehicle, and also receive a 1090ES translation of that message from a ground relay station. As described below, the dual-technology ADS-B system of the AAV 216 may the correlate the two messages in order to avoid confusion, and possibly to aggregate non-overlapping information in the two versions of the message.

Illustrative Autonomous Aerial Vehicle Dual-Technology Tracking System

Figure 3:
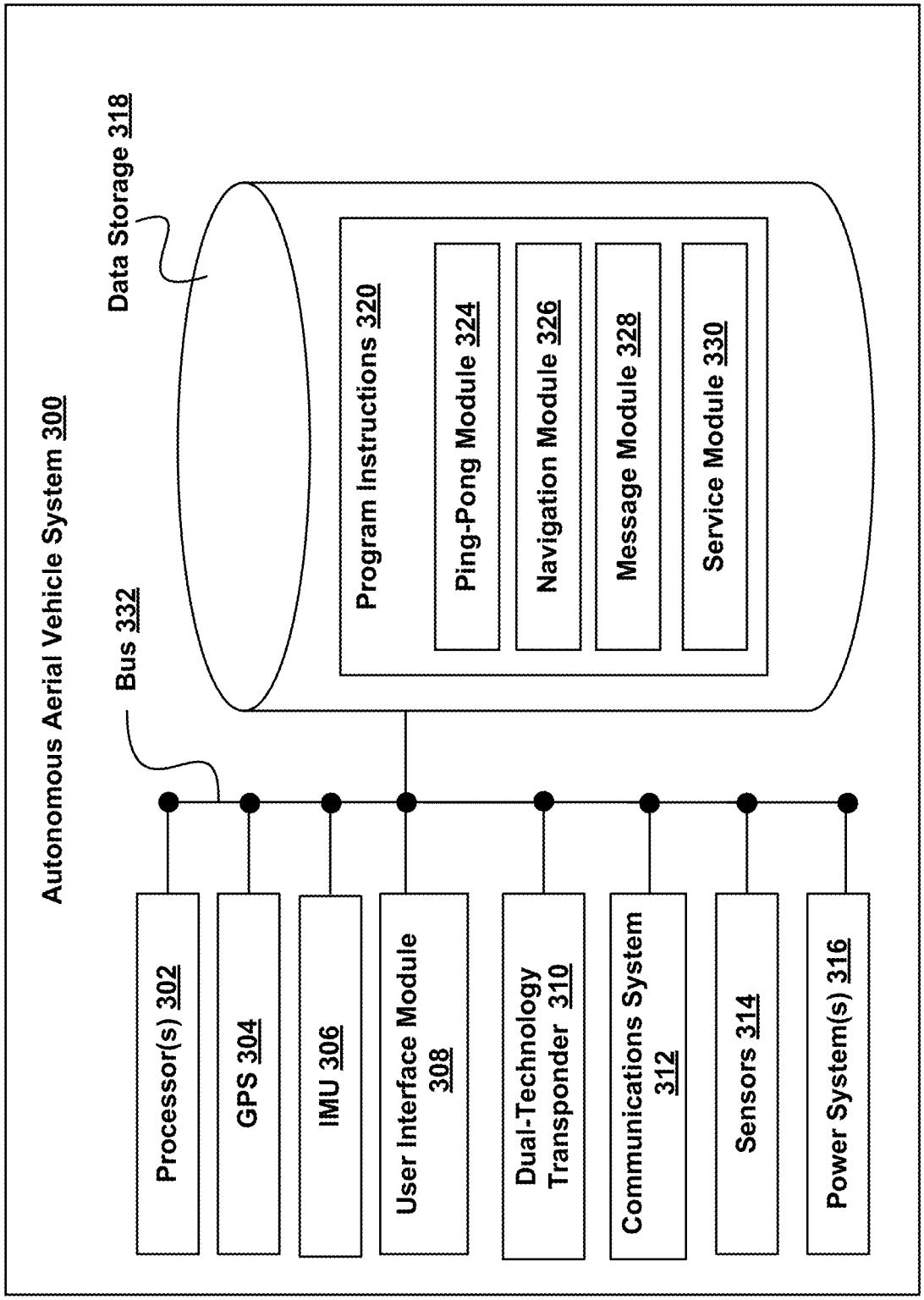
FIG. 3 is a simplified block diagram of some components of an autonomous aerial vehicle in which technology onboard air traffic tracking may be implemented, in accordance with example embodiments.

FIG. 3 is a simplified block diagram illustrating components of an autonomous aerial vehicle 300 with a dual-technology air traffic tracking system, according to an example embodiment. A dual-technology air traffic tracking system may be implemented in an AAV such as AAV 116 in FIG. 1 or AAV 216 in FIG. 2, for example, and may take various forms. In an example embodiment, a dual-technology air traffic tracking system may be a self-contained unit for installation in an AAV. In such a configuration, the dual-technology system may interact with other components of the AAV, such that the operations described herein are achieved. In another example embodiment, a dual-technology air traffic tracking system may be implemented as a distributed system that shares at least some of the componentry of the AAV, such that some of the functions are carried out by components of the AAV that are not necessarily dedicated only the dual-technology system, while other functions may be carried out by components specific to and/or dedicated to dual-technology operations. By way of example FIG. 3 shows a distributed system implementation.

The AAV 300 may include one or more processors 302, a GPS system 304, an inertial measurement unit (IMU) 306, a user interface module 308, a dual-technology transponder 310, a communications system 312, one or more sensors 314, a power system 316, and data storage 318. These components may be linked by a bus 332, which may support communications and electrical power distribution/delivery, among other functions. The data storage 318 may take various forms, such as solid state memory and/or flash memory, for example, and may include data storage for program instructions 320 for various functions and operations described herein. These various example components and modules are described below.

The processor(s) 302 may be a general-purpose processor(s) or a special purpose processor(s) (e.g., digital signal processors, application specific integrated circuits, etc.). The one or more processors 302 can be configured to execute computer-readable program instructions 320 that are stored in the data storage 318 and are executable to provide the functionality of the AAV 300 described herein. As described in more detail below, at least some portions of the program instructions 320 may be configured as modules for specific operational and functional purposes. Note that other hardware components of the AAV 300 may incorporate dedicated processors (e.g., microprocessors) separate from the processors 302 to carry out various operations and functions specific to those components.

The GPS system 302 may include a GPS receiver and be configured to provide data that is typical of well-known GPS systems, such as the GPS coordinates of the AAV 300. Such GPS data may be utilized by the autonomous aerial communications system 300 for various functions. Other data provided by the GPS system, either as directly measured from GPS signals received from a GPS satellite or derived from analysis of GPS data in a received signal may include flight heading and speed (e.g., velocity), and altitude. These data may then form location/heading information used in reporting tracking data via the dual-technology air traffic tracking system. In addition, the AAV 300 may use its GPS receiver to help navigate to the destination, as indicated, at least in part, by a GPS coordinates provided by a destination entity.

The IMU 306 may include both an accelerometer and a gyroscope. Furthermore, the accelerometer and the gyroscope may be used together to determine an orientation of the autonomous aerial communications system 300 and/or an orientation of the aerial vehicle on which it is implemented. In particular, the accelerometer can measure the orientation of the aerial vehicle with respect to earth, while the gyroscope measures the rate of rotation around an axis. Some example IMUs are commercially available in low-cost, low-power packages. For instance, an IMU may take the form of or include a miniaturized MicroElectroMechanical System (MEMS) or a NanoElectroMechanical System (NEMS). Other types of IMUs may also be utilized.

In addition to accelerometers and gyroscopes, the IMU 306 may include other sensors to help better determine position and/or help to increase autonomy of the AAV 300. Two examples of such sensors are magnetometers and pressure sensors. In some embodiments, the autonomous aerial communications system may include a low-power, digital 3-axis magnetometer, which can be used to realize an orientation independent electronic compass for accurate heading information. However, other types of magnetometers may be utilized as well. Additional types of vehicle situation and/or inertial sensors may include a pressure sensor or barometer, and a sonic or radar altimeter. The IMU 306 may integrate some or all these vehicle situation and/or inertia sensors. Alternatively, some or all of them may be employed as separate components.

The user interface module 308, which may be include one or more hardware components, can be operable to send data to and/or receive data from external user input/output devices. For example, user interface module 308 can be configured to send and/or receive data to and/or from user input devices such as a keyboard, a keypad, a touch screen, a computer mouse, a track ball, a joystick, a camera, a voice recognition module, and/or other similar devices. The user interface module 308 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. The user interface module 308 can also be configured to generate audible output(s), such as a speaker, speaker jack, audio output port, audio output device, earphones, and/or other similar devices.

The dual-technology transponder 310 functions to broadcast real-time tracking information of the AAV 300 on each of two air-interface technologies, and to receive real-time tracking messages on both of the two air-interface technologies. In an example embodiment, the dual-technology transponder 310 may operate according to and/or in compliance with ADS-B, and the two technologies may be 1090ES and UAT. However, other pairs of air-interface technologies may be used as well. As noted, under ADS-B, broadcasted real-time tracking information corresponds to ADS-B Out messages (with respect to the broadcasting vehicle), and received real-time tracking messages correspond to ADS-B In messages (with respect to the receiving vehicle). When referring to ADS-B Out/In messages of one or the other of the two technologies, the terms "1090ES Out," "1090ES In," "UAT Out," and "UAT In" will also be used.

In accordance with example embodiments, the broadcasts can be controlled such that they alternate back-and-forth in time—in ping-pong fashion—between the two transmission technologies. Control operations that result in ping-pong broadcasts may be implemented internally to the dual-technology transponder 310, such as by an integrated microprocessor or the like. Alternatively, the control may be carried out by an external device or component, such as the processors 302, under execution of program instructions for this purpose. The illustration of FIG. 3 shows the latter type of control (i.e., external), by way of example. In accordance with example embodiments, the relative timing of the ping-pong broadcasts, including the periodicity, inter-broadcast interval, and duration of each broadcast, may be adjustable and also under control of a controlling entity.

Also in accordance with example embodiments, reception of incoming real-time tracking messages of other aircraft or vehicles may come directly from the other vehicles and/or from one or more ground relay stations. Received messages may be processed for extraction of content either internally by the dual-technology transponder, such as by an integrated microprocessor or the like, or, alternatively, may be provided to an external processing agent, such as the processors 302 executing program instructions for this purpose. The illustration of FIG. 3 shows the latter type of message processing (i.e., external), by way of example. In the event that inbound tracking messages received on the two different technologies carry duplicate information, message processing may also function to correlate such duplication. Correlation may involve recognition of duplication, and aggregation of non-overlapping information in the received messages. As noted above, duplication can occur when the dual-technology transponder 310 receives a tracking message directly from a flight vehicle on one technology, and receives a translated version of the tracking message via a ground relay station on the other technology. Correlation may also involve resolving time differences between receptions directly received messages and delayed duplicates received via ground relay stations.

In accordance with example embodiments, the dual-technology transponder 310 may be low-power, light-weight, and have physical size dimensions such that it can be accommodated by the AAV 300. In an example embodiment, the dual-technology transponder 310 may be configured to transmit at 0.25 Watts or less, weigh 4 grams (g) or less, and have linear dimensions of 48 mm (or less) by 27 mm (or less). These are example metrics, and could vary up or down depending on the specific AAV and what it can accommodate for power, weight, and size. More particularly, requirements for power, weight, and size limitations of the dual-technology transponder 310 may be determined, at least in part, by how much power the AAV can provide, how much weight the AAV can operationally carry, and how much physical space in available in or on the AAV the transponder.

As described in more detail below, message processing, whether internal or external to the dual-technology transponder 310, also functions to prepare real-time flight tracking messages of the AAV 300 for ping-pong broadcasts. Message preparation may entail formatting location, heading, speed information from the GPS system (and possibly other sensors) into digital data packets defined according to each of the two transmission technologies. Other information that may be may be inserted or added in real-time tracking messages may include, without limitation, one or more identifiers of the AAV, one or more time stamps, weather and/or atmospheric measurements, and other environmental measurements or data.

The communications system 312 may support communications with external devices via one or more wired and/or wireless interfaces. In an example embodiment, the communications system 312 may include a network-communications interface module having one or more wireless interfaces and/or one or more wireline interfaces that are configurable to communicate with one or more networks. Wireless interfaces can include one or more wireless transmitters, receivers, and/or transceivers. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), DSRC/802.11p and/or other wireless communication protocols. Wireline interfaces can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, the communications system 312 can perform at least some of the functionality of a communication interface for the AAV 300. For example, the communications system 312 can include a tunable aviation radio configured for use in voice communications and/or a radar transponder for automatically reporting data, such as one or more events related to an aerial vehicle's operation.

In other embodiments, the communications system 312 can be configured to provide reliable, secured, and/or authenticated communications. For each communication, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

In some embodiments, the communications system 312 may support both short-range communication and long-range communication. For example, the AAV 300 may be configured for short-range communications using Bluetooth and for long-range communications under a CDMA protocol. In such an embodiment, the AAV 300 may be configured to function as a "hot spot;" or in other words, as a gateway or proxy between a remote support device and one or more data networks, such as a cellular network and/or the Internet. Configured as such, the AAV 300 may facilitate data communications that the remote support device would otherwise be unable to perform by itself.

For example, the AAV 300 may provide a WiFi connection to a remote device, and serve as a proxy or gateway to a cellular service provider's data network, which the autonomous aerial communications system might connect to under an LTE or a 3G protocol, for instance. The AAV 300 could also serve as a proxy or gateway to a high-altitude balloon network, a satellite network, or a combination of these networks, among others, which a remote device might not be able to otherwise access.

In addition to the IMU 306 and integrate and/or related sensors, the AAV 300 may further include one or more additional sensors 314 that allow the autonomous aerial system to sense objects in the environment. For instance, AAV 300 may include one or more ultrasonic sensors. Ultrasonic sensors can determine the distance to an object by generating sound waves and determining the time interval between transmission of the wave and receiving the corresponding echo off an object. Further, an ultrasonic sensor can also be used for vehicles that need to hover at a certain height or need to be capable of detecting obstacles. Other sensors can be used to determine, sense the presence of, and/or determine the distance to nearby objects, such as a light detection and ranging (LIDAR) sensor, laser detection and ranging (LADAR) sensor, and/or an infrared or forward-looking infrared (FLIR) sensor, among other possibilities. Still other sensors may include a vision-based positioning system, such as fiducial based navigation, map relative navigation, or simple vision patch tracking systems.

In some embodiments, AAV 300 may also include one or more imaging sensors. For example, one or more still and/or video cameras may be utilized by the autonomous aerial communications system to capture image data from the environment in which it operates. As a specific example, charge-coupled device (CCD) cameras or complementary metal-oxide-semiconductor (CMOS) cameras can be used with the AAV 300. Such imaging sensors have numerous possible applications, such as obstacle avoidance, localization techniques, ground tracking for more accurate navigation (e.g., by applying optical flow techniques to images), video feedback, and/or image recognition and processing, among other possibilities.

The power system 316 may include one or more hardware elements that provide and manage power delivery to the AAV 300. It may also incorporate one or more microprocessors, as well as firmware, and/or software instructions for execution by the one or more microprocessors for the purpose of operation of the power system 316. The power system 316 may control one or more power supplies and power conditioners as sources of electrical power, and monitor power needs and status of various components of the AAV 300 with respect to power consumption, for example.

The data storage 318 may include or take the form of one or more computer-readable storage media that can be read or accessed by the processor(s) 302. The one or more computer-readable storage media can include volatile and/or non-volatile storage components, such as optical, magnetic, organic or other memory or disc storage, which can be integrated in whole or in part with at least one of the one or more processors 302. In some embodiments, the data storage 318 can be implemented using a single physical device (e.g., one optical, magnetic, organic or other memory or disc storage unit), while in other embodiments, the data storage 318 can be implemented using two or more physical devices.

In accordance with example embodiments, the data storage 318 can include computer-readable program instructions 320 and perhaps additional data, such as diagnostic data of the AAV 300. As such, program instructions 320 may include instructions that, when executed by the processors 302, cause the AAV 300 to carry out some or all of the functionality described herein. By way of example, the program instructions 320 are shown to be configured as purpose-specific modules. In the illustration of FIG. 3, the modules include a ping-pong module 324, a navigation module 326, a message module 328, and a service module 330. There could be more or fewer modules configured for other purposes besides the ones of the present example. In addition, data storage may 320 may include storage for user data, program data, and data storage for other functions. Note that one or more modules may also include data storage specific to the functions of the modules.

The ping-pong module 324 provides functionality for control of ping-pong broadcasting of dual-technology real-time tracking messages. In an example embodiment, the ping-pong module may include instructions that, when executed by a controlling processor, cause broadcast of real-time tracking messages, alternating in time between the two technologies. For example, real-time tracking information at a given instant may be formatted into two messages: a first message formatted and prepared for broadcast according to the first technology, and a second message formatted and prepared for broadcast according to the second technology. The first message may then be broadcast on the first technology, and after a specified time interval the second message may be broadcast on the second technology. This process of message preparation and ping-pong broadcasting may be repeated continually for a specified time during which the AAV 300 is operational at some level. Note that the first message may be formatted, prepared, and broadcast all before the second message is formatted and prepared (and broadcasted). That is, message formatting and preparation may be carried out in ping-pong fashion as well, in correspondence with ping-pong broadcasting.

In accordance with example embodiments, the two technologies may be 1090ES and UAT, operating in accordance with ADS-B. However, the ping-pong module 324 could be arranged to control ping-pong broadcasting of real-time tracking messages on any two transmission technologies. Further, the principles of ping-pong broadcasting could be extended to more than two transmission technologies. For example, real-time tracking messages could be broadcast on three or more transmission technologies in "round-robin" fashion (e.g., cycling through the three or more technologies repeatedly), or some other specified ordering. The ping-pong module 324 could be configured to cause a controlling processor to control a multi-technology transponder to operate in such round-robin (or other) manner.

In the example of FIG. 3, the ping-pong module 324 may include or effectively be software instructions that, when execute by the processors 302, cause the processors 320 to control the dual-technology transponder 310 so as to operate as described. It will be appreciated that the ping-pong module 324 could be implemented as hardware and/or firmware instructions for execution by microprocessor of the dual-technology transponder 310. Other arrangements of a ping-pong module for control the dual-technology transponder 310 are possible as well.

The navigation module 326 provides functionality for navigation operations of the AAV 300. Such functionality may include applying navigation data from the GPS 304, IMU 306, and other sensors 314 as real-time input to operations and/or algorithms for determining flight control in order to travel between specified locations. Thus, flight control may entail control of heading, speed, altitude, attitude, and other dynamic state of the AAV 300 during the course of flight, using navigation data as input. The navigation module 326 may include instructions that, when executed by the processors 302, carry out these and possibly other navigation operations.

Navigation operations may also include flight safety maneuvers determined and carried out in response to real-time tracking information of other flight vehicles received via the dual-technology transponder 310. For example, the navigation module 326 may determine from ADS-B In messages that it needs to alter the current flight path of the AAV 300 in order to safely avoid a nearby air vehicle. The navigation module 326 may then cause flight control to execute the necessary alterations to the AAV's flight path. The navigation module 326 may carry out other operations as well. The ones describe above are not intended to be limiting examples.

The message module 328 may provide functionality for preparing real-time tracking messages for ping-pong broadcasting, and for processing and decoding received real-time tracking messages from other flight vehicles. Processing and decoding of received messages may include extracting and analyzing or interpreting real-time tracking data of the other flight vehicles. In accordance with example embodiments, preparing real-time tracking messages for ping-pong broadcasting may entail receiving real-time tracking data of the AAV from the GPS 304, IMU 306, and other sensors 314, and formatting the data into messages according to protocols and/or standards of the two transmission technologies.

For example embodiments compliant with ADS-B, the two messages types are 1090ES Out and UAT Out. Thus, the message module 328 may generate a 1090ES Out message and a UAT Out message for each set of real-time tracking data at each a sequence of time instants during AAV operation. Each time instant could be defined according to time instants count out on a clock, such as every 1 or 2 seconds, for example. Each message may include the geographic location of the AAV 300 at the time of measurement or reporting from the GPS 304, as well as an identifier of the AAV 300. Additional information may include heading and speed (velocity), acceleration, environmental data (e.g., barometric pressure altitude), and a time stamp. Other information may be included as well.

In an example embodiment, the message module 328 may prepare both a 1090ES Out message and a UAT Out message for a given instant by incorporating duplicate data for the same time instant in the two messages. In another embodiment, the message module 328 may prepare both the 1090ES Out message and the UAT Out message at slightly different instants that are aligned with the ping-pong broadcast order of the two Out messages. In the latter case, the real-time tracking information in the pair of 1090ES Out and UAT Out messages might differ by an amount corresponding to the difference time between tracking measurements. For a ping-pong frequency on the order of one Hertz (one per second), the difference in real-time tracking would likely be small, and possibly negligible. For example, in some embodiments, the rate at which a flight control system onboard an AAV may update the message module 328 (or other component that prepares outgoing messages) may be much higher than the rate at which ping-pong messages are broadcast. In this case, ping-pong 1090ES Out and UAT Out messages could carry different tracking data. Even so, if ping-pong 1090ES Out and UAT Out messages follow each other closely in time, then differences in the real-time tracking would be small. For such embodiments, the difference in real-time tracking between ping-pong messages would thus depend on the relative rates of updates from the flight control system and outgoing ping-pong messages.

In an example embodiment, real-time tracking messages for broadcast may be delivered to the ping-pong module 324, which then in turn provides them to the dual-technology transponder 310 for ping-pong broadcast. The pairs of dual technology messages could be delivered together or in serial sequence corresponding to their order of ping-pong broadcast. In another example embodiment, real-time tracking messages for broadcast may be delivered directly to the dual-technology transponder 310.

In accordance with example embodiments, processing and decoding of received real-time tracking messages can further entail providing the extracted real-time tracking data of one or more other flight vehicles to the navigation module 326 for application to flight safety and collision avoidance functions. As described above, the navigation module 326 could use the real-time tracking information to determine if any adjustments the flight path, flight heading, and/or speed are required, and cause flight control of the AAV to take appropriate actions.

In the example of dual-technology real-time flight tracking illustrated in FIG. 3, the functionality and operations described above are distributed among the dual-technology transponder 310, the ping-pong module 324, the message processing module 328, and the processors 302. As noted above, some or all this functionality and operations could be integrated within a self-contained device or component. Other configurations are possible as well.

The service module 330 may support various mission-specific purposes of the AAV 300. For example, if the AAV 300 is used for physical parcel delivery, the service module 330 might include a list of delivery items or a total weight of the package(s) and corresponding delivery location(s) or delivery zone(s), as well as functions for tracking and reporting deliveries. Other examples of mission-specific purposes could include weather and/or environmental monitoring and emergency services. The service module 330 could support other aspects of AAV operations as well.

Figure 4B:
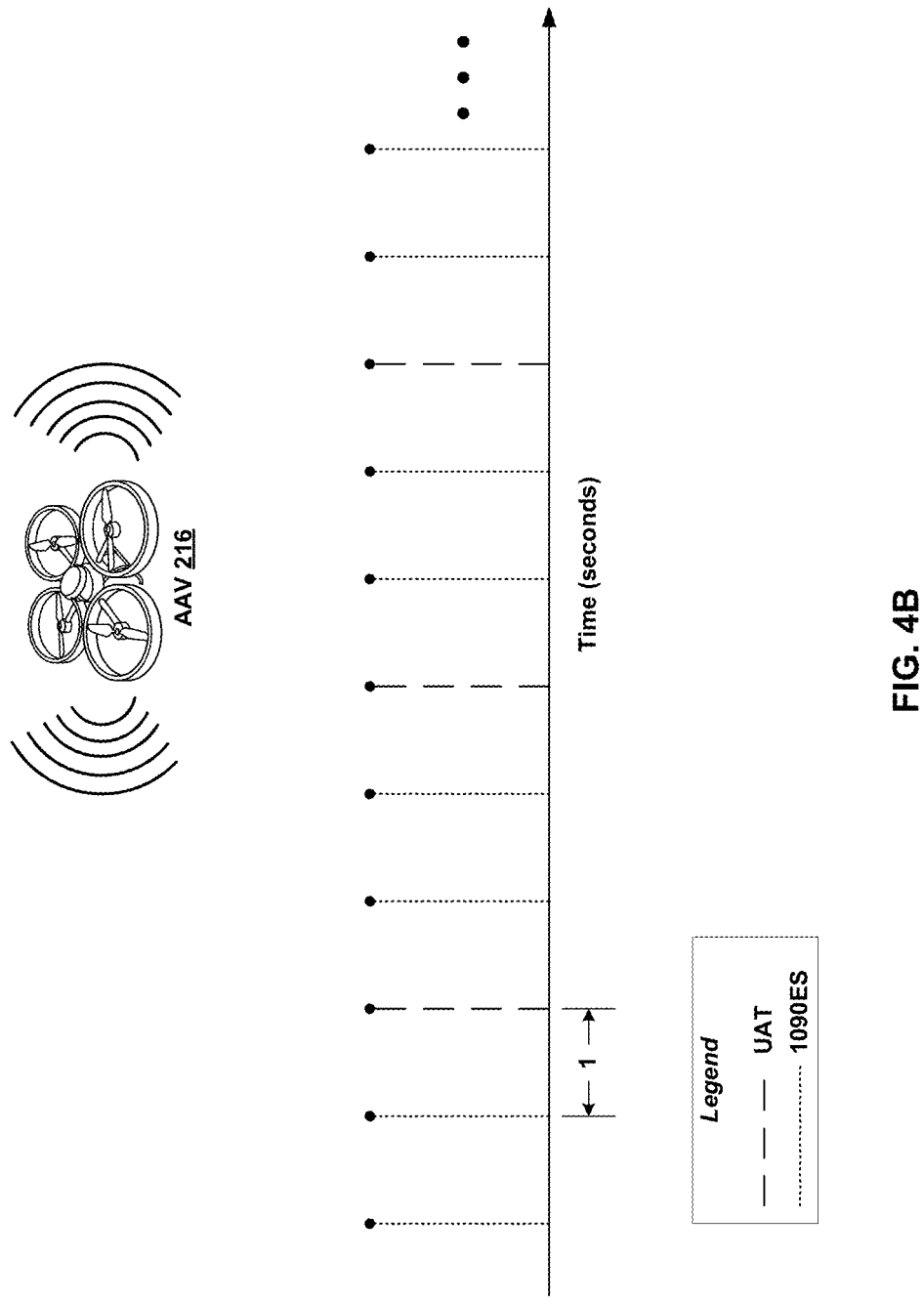
FIG. 4B depicts an illustrative representation of another example mode of dual-technology broadcasting of flight tracking messages, in accordance with example embodiments.

FIGS. 4A and 4B show two examples of portions of possible timing sequences for ping-pong transmissions of ADS-B Out messages. As in previous figures, 1090ES transmissions are represented in short-dotted lines, and UAT messages are represented in long-dashed lines. In the first example, shown in FIG. 4A, 1090ES and UAT messages are broadcast in strictly alternating fashion, each alternation being a single broadcast of a 1090ES Out message or a UAT Out message. By way of example, the inter-message-broadcast time is 1 second.

In the second example, shown in FIG. 4B, each alternation consists of two consecutive 1090ES messages followed by a single UAT message. Such an alternative broadcast-timing pattern (or possibly others) could be used to accommodate particular operational conditions or differing aspects of broadcast protocols for 1090ES and UAT, for example. Again by way of example, the inter-message-broadcast time is 1 second. Other intervals could be used as well. As described above, control of the ping-pong pattern and timing could be carried out by the ping-pong module 324.

Example Methods of Operation

FIG. 5 is a flowchart of method 500, in accordance with an example embodiment. Method 500 can be executed by, or under control of, a computing device, such as processors 302, executing instructions stored in non-transitory computer-readable memory, such as those of the ping-pong module 324 stored in the data storage 318, for example. In another example, one or more processors and non-transitory computer-readable memory storing instruction could be part of a self-contained device that includes a dual-technology transponder. As noted above, computer-executable instructions could be software, firmware, and/or hardware instructions.

At block 502, an aerial vehicle (AV) determines real-time tracking data of the AV from a navigation system onboard the AV. The tracking data includes geographic location of the AV over time.

At block 504, a low-power dual-technology transponder onboard the AV is used to broadcast outbound tracking messages alternatingly in time using a first transmission technology and a second, different transmission technology in ping-pong fashion. The outbound tracking messages include the determined real-time tracking data over time and an identifier of the AV, and the first and second transmission technologies are specified for operation within a common flight tracking system. In accordance with example embodiments, the real-time tracking data further may also include real-time velocity and acceleration of the AV.

In an example embodiment, the common flight tracking system could be ADS-B, the first technology is UAT, and the second technology could be 1090ES.

In accordance with example embodiments, broadcasting the outbound tracking messages alternatingly in time using the first and second transmission technologies in ping-pong fashion may entail generating a first-type outbound tracking messages over a time interval according to a protocol for the first transmission technology, and generating a second-type outbound tracking messages over the time interval according to a protocol for the second transmission technology, and then alternating between broadcasting of the first-type outbound tracking messages using the first transmission technology and broadcasting of the second-type outbound tracking messages using the second transmission technology. Alternating between broadcasting of the first-type outbound tracking messages using the first transmission technology and broadcasting of the second-type outbound tracking messages using the second transmission technology could further entail broadcasting repeating cycles of alternating the first-type and second-type outbound tracking messages, each cycle comprising an alternation between at least one first-type outbound message and at least one second-type outbound message.

In further accordance with example embodiments, the method 500 could further entail using the low-power dual-technology transponder onboard the AV to receive one or more incoming tracking messages on at least one of the first or second transmission technologies. Each incoming tracking message could include real-time tracking data and identifier information of a flight vehicle other than the AV. Each of the received messages could then be decoded to determine the included real-time tracking data of the flight vehicle other than the AV.

The method 500 could still further entail determining that a first incoming tracking message received on the first transmission technology and a second incoming tracking message received on the second transmission technology both contain concurrent real-time tracking data for the same flight vehicle other than the AV. In the example of ADS-B described above, this could occur, for instance when a 1090ES message is directly received from another vehicle, while a duplicate is received on UAT via a ground relay station. Or the reverse could occur: a UAT message could be directly received from another vehicle, while a duplicate is received on 1090ES is received via a ground relay station.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for provided for explanatory purposes and are not intended to be limiting, with the true scope being indicated by the following claims.

What is claimed:

1. An autonomous aerial vehicle (AAV) comprising:
a low-power dual-technology transponder configured to transmit real-time tracking data of the AAV in outbound tracking messages using both a first transmission technology and a second, different transmission technology, wherein the first and second transmission technologies are specified for operation within a common flight tracking system, and wherein the common flight tracking system is Automatic Dependent Surveillance-Broadcast (ADS-B), the first transmission technology is Universal Access Transmitter (UAT), and the second transmission technology is MHz Extended Squitter (1090ES);
a global positioning satellite (GPS) navigation system;
one or more processors; and
memory storing instructions that, when executed by the one or more processors, cause the AAV to carry out operations including:
determining real-time tracking data of the AAV from the GPS navigation system, the real-time tracking data including real-time geographic location of the AAV over time; and
broadcasting outbound tracking messages alternatingly in time using the first and second transmission technologies in ping-pong fashion, the outbound tracking messages including the determined real-time tracking data over time and an identifier of the AAV.

2. The AAV of claim 1, wherein the real-time tracking data further include real-time velocity and acceleration of the AAV.

3. The AAV of claim 1, wherein broadcasting the outbound tracking messages alternatingly in time using the first and second transmission technologies in ping-pong fashion comprises:
generating first-type outbound tracking messages over a time interval according to a protocol for the first transmission technology, and generating second-type outbound tracking messages over the time interval according to a protocol for the second transmission technology; and
alternating between broadcasting of the first-type outbound tracking messages using the first transmission technology and broadcasting of the second-type outbound tracking messages using the second transmission technology.

4. The AAV of claim 1, wherein the low-power dual-technology transponder is further configured to receive incoming tracking messages transmitted on either one or both of the first and second transmission technologies,
and wherein the operations further include:
receiving one or more incoming tracking messages on at least one of the first or second transmission technologies, each incoming tracking message including real-time tracking data and identifier information of a flight vehicle other than the AAV; and
decoding each of the received one or more incoming tracking messages to determine the included real-time tracking data of the flight vehicle other than the AAV.

5. The AAV of claim 4, wherein the operations further include:
determining that a first incoming tracking message received on the first transmission technology and a second incoming tracking message received on the second transmission technology both contain concurrent real-time tracking data for the same flight vehicle other than the AAV.

6. The AAV of claim 1, wherein the low-power dual-technology transponder is configured to transmit using no greater than 0.25 Watts.

7. The AAV of claim 1, wherein the low-power dual-technology transponder has a weight of no greater than 4 grams, and linear dimensions of 27 millimeters wide by 48 millimeters long.

8. A flight-tracking communication device configured for operation in an aerial vehicle (AV), the flight-tracking communication device comprising:
a low-power dual-technology transponder configured to transmit real-time tracking data of the AV in outbound tracking messages using both a first transmission technology and a second, different transmission technology, wherein the first and second technologies are specified for operation within a common flight tracking system, and wherein the common flight tracking system is Automatic Dependent Surveillance-Broadcast (ADS-B), the first transmission technology is Universal Access Transmitter (UAT), and the second transmission technology is MHz Extended Squitter (1090ES);
one or more processors; and
memory storing instructions that, when executed by the one or more processors, cause the flight-tracking communication device to carry out operations including:
receiving real-time tracking data of the AV from a global positioning satellite (GPS) navigation system, the real-time tracking data including real-time geographic location of the AV over time; and
broadcasting outbound tracking messages alternatingly in time using the first and second transmission technologies in ping-pong fashion, the outbound tracking messages including the determined real-time tracking data over time and an identifier of the AV.

9. The flight-tracking communication device of claim 8, further comprising the GPS navigation system.

10. The flight-tracking communication device of claim 8, wherein the real-time tracking data further include real-time velocity and acceleration of the AV.

11. The flight-tracking communication device of claim 8, wherein broadcasting the outbound tracking messages alternatingly in time using the first and second transmission technologies in ping-pong fashion comprises:
generating first-type outbound tracking messages over a time interval according to a protocol for the first transmission technology, and generating second-type outbound tracking messages over the time interval according to a protocol for the second transmission technology; and
alternating between broadcasting of the first-type outbound tracking messages using the first transmission technology and broadcasting of the second-type outbound tracking messages using the second transmission technology.

12. The flight-tracking communication device of claim 8, wherein the low-power dual-technology transponder is further configured to receive incoming tracking messages transmitted on either one or both of the first and second transmission technologies,
and wherein the operations further include:
receiving one or more incoming tracking messages on at least one of the first or second transmission technologies, each incoming tracking message including real-time tracking data and identifier information of a flight vehicle other than the AV; and decoding each of the received one or more incoming tracking messages to determine the included real-time tracking data of the flight vehicle other than the AV.

13. The flight-tracking communication device of claim 8, wherein the low-power dual-technology transponder is configured to transmit using no greater than 0.25 Watts.

14. The flight-tracking communication device of claim 8, wherein the low-power dual-technology transponder has a weight of no greater than 4 grams, and linear dimensions of 27 millimeters wide by 48 millimeters long.

15. A method comprising:

in an aerial vehicle (AV), determining real-time tracking data of the AV from a navigation system onboard the AV, the tracking data including geographic location of the AV over time; and using a low-power dual-technology transponder onboard the AV, broadcasting outbound tracking messages alternatingly in time using a first transmission technology and a second, different transmission technology in ping-pong fashion, the outbound tracking messages including the determined real-time tracking data over time and an identifier of the AV, wherein the first and second transmission technologies are specified for operation within a common flight tracking system, and wherein the common flight tracking system is Automatic Dependent Surveillance-Broadcast (ADS-B), the first transmission technology is Universal Access Transmitter (UAT), and the second transmission technology is MHz Extended Squitter (1090ES).

16. The method of claim 15, wherein the real-time tracking data further include real-time velocity and acceleration of the AV.

17. The method of claim 15, wherein broadcasting the outbound tracking messages alternatingly in time using the first and second transmission technologies in ping-pong fashion comprises:

generating first-type outbound tracking messages over a time interval according to a protocol for the first transmission technology, and generating second-type outbound tracking messages over the time interval according to a protocol for the second transmission technology; and alternating between broadcasting of the first-type outbound tracking messages using the first transmission technology and broadcasting of the second-type outbound tracking messages using the second transmission technology.

18. The method of claim 17, wherein alternating between broadcasting of the first-type outbound tracking messages using the first transmission technology and broadcasting of the second-type outbound tracking messages using the second transmission technology comprises:

broadcasting repeating cycles of alternating first-type and second-type outbound tracking messages, each cycle comprising an alternation between at least one first-type outbound message and at least one second-type outbound message.

19. The method of claim 15, further comprising:

using the low-power dual-technology transponder onboard the AV, receiving one or more incoming tracking messages on at least one of the first or second transmission technologies, each incoming tracking message including real-time tracking data and identifier information of a flight vehicle other than the AV; and decoding each of the received one or more incoming tracking messages to determine the included real-time tracking data of the flight vehicle other than the AV.

20. The method of claim 19, further comprising:

determining that a first incoming tracking message received on the first transmission technology and a second incoming tracking message received on the second transmission technology both contain concurrent real-time tracking data for the same flight vehicle other than the AV.

* * * * *